(12) United States Patent
Chuan et al.

(10) Patent No.: US 8,549,633 B2
(45) Date of Patent: Oct. 1, 2013

(54) SECURITY CONTROLLER

(75) Inventors: Lim Seow Chuan, Letchworth Garden (GB); Timothy Charles Mace, Haverhill (GB)

(73) Assignee: ARM Limited, Cambridge (GB)

( * ) Notice: Subject to any disclaimer, the term of this patent is extended or adjusted under 35 U.S.C. 154(b) by 105 days.

(21) Appl. No.: 13/137,293

(22) Filed: Aug. 3, 2011

(65) Prior Publication Data

US 2013/0036465 A1 Feb. 7, 2013

(51) Int. Cl.
*G06F 17/30* (2006.01)
*G06F 11/00* (2006.01)

(52) U.S. Cl.
USPC ..................................... 726/22; 726/2; 726/3

(58) Field of Classification Search
None
See application file for complete search history.

(56) References Cited

U.S. PATENT DOCUMENTS

| 6,038,619 | A  | * | 3/2000  | Berning et al. | 710/33  |
| 6,981,106 | B1 | * | 12/2005 | Bauman et al.  | 711/146 |
| 7,966,439 | B1 | * | 6/2011  | Treichler et al. | 710/306 |

OTHER PUBLICATIONS

PrimeCell Infrastructure AMBA 3 AXI TrustZone Memory Adapter (BP141), Technical Overview, *Arm Limited*, 2006, pp. 1-12.

* cited by examiner

*Primary Examiner* — David Y Jung
(74) *Attorney, Agent, or Firm* — Nixon & Vanderhye P.C.

(57) ABSTRACT

A security controller has first and second read request paths for performing security checking of read requests received from a master device and for controlling issuing of the read request to a safe device. If the first read request path is selected for an incoming read request then the first read request path controls issuing of the read request in dependence on result of the security checking. If the second read request path is selected, then the incoming read request is issued without waiting for a result of the security checking, and tracking data is stored indicating the result of the security checking. When receiving a response to a read request issued using the second read request path, a response path modifies the response to mask read data if the tracking data stored for the corresponding read request indicates that a security violation occurred.

20 Claims, 9 Drawing Sheets

| ID (250) | transaction order (260) | security violation ? (270) |
|---|---|---|
| 0 | 0 | 0 |
| 1 | 0 | 0 |
| 2 | 1 | 0 |
| 0 | 2 | 0 |
| 2 | 0 | 0 |
| 1 | 1 | 1 |
| 3 | 0 | 0 |
| 0 | 1 | 0 |

SECURITY CONTROLLER

BACKGROUND OF THE INVENTION

1. Field of the Invention

The present invention relates to a security controller, in particular a security controller for performing security checking of transaction requests received from a master device and controlling issuing of the transaction requests to a slave device.

2. Description of the Prior Art

A data processing apparatus may comprise one or more master devices and one or devices. A master device may generate transaction requests, such as read requests or write requests, and a slave device may respond to the transaction requests, for example by reading data from, or writing data to, a storage device in response to the transaction requests. Some transaction requests may relate to secure data for which access is controlled in accordance with certain security constraints. Hence, it is known to provide a security controller for performing security checking of transaction requests received from a master device. Based on the result of the security checking, the security controller then controls issuing of the transaction requests to the slave device.

However, the security checking performed by the security controller can increase the latency with which the slave device can respond to a transaction request issued by the master device. For example, the security controller may require several processing cycles to perform the security checking and this can cause a delay in issuing the transaction request to the slave device. Especially for read requests, a delay in servicing a transaction request will tend to reduce the performance of the master device which issued the transaction request, so it is desirable to reduce the latency associated with performing security checking of transaction requests.

Another consideration is the number of outstanding transaction requests which can be handled by the security controller at once. To maintain a high level of processing performance, it is generally desirable that a security controller can handle many outstanding transaction requests at a time, so that it is reasonably rare that a pending transaction request is blocked while awaiting security checking by the security controller.

Hence, the present technique seeks to provide a security controller which performs security checking of transaction requests with a reduced response latency yet which is also able to handle a relatively large number of transaction requests.

SUMMARY OF THE INVENTION

Viewed from one aspect, the present invention provides a security controller comprising:

first and second read request paths configured to perform security checking of read requests received from at least one master device and to control issuing of said read requests to at least one slave device; and a selector configured to select which of said first read request path and said second read request path to use for controlling issuing of an incoming read request; wherein:

if said first read request path is selected for said incoming read request, then said first read request path controls issuing of said read request to a target slave device in dependence on a result of said security checking;

if said second read request path is selected for said incoming read request, then said second read request path issues said incoming read request to said target slave device without waiting for a result of said security checking, and stores to a tracking data store tracking data indicating said result of said security checking;

said security controller comprises a response path configured to receive a response to an issued read request from said target slave device and to forward said response to a source master device which initiated said issued read request; and if said tracking data indicates that said security checking identified a security violation for an issued read request issued using said second read request path, then said response path modifies the response to said issued read request to mask read data read by said target slave device in accordance with said issued read request, and forwards the modified response to said source master device.

The security controller of the present technique is provided with first and second read request paths for performing security checking of read requests received from at least one master device and controlling issuing of the read requests to at least one slave device, and a response path for receiving a response to the issued read requests from the slave device and forwarding the responses to the master device. When an incoming read request is received, a selector selects which of the first read request path and the second read request path to use for controlling issuing of the incoming read request.

If the first read request path selected, then the security checking is performed and the first read request path controls issuing of the read request to a target slave device in dependence on the result of the security checking. On the other hand, if the second read request path is selected for an incoming read request, then the second read request path issues the incoming request to the target slave device without waiting for the result of security checking and, once the result of the security checking becomes available, stores tracking data indicating the security checking result to a tracking data store.

It is possible that a read request which fails the security checking is nevertheless issued to the slave device by the second read request path. To prevent the read data obtained in response to such a read request becoming available to the master device, the response path can modify the response to the read request to mask the read data if the tracking data for the corresponding read request indicates that a security violation was identified. Hence, security of the read data is maintained.

The combination of the first and second read request paths provides a better balance between a achieving a low response latency and being able to handle a large number of outstanding transaction requests than would be achieved by either read request path on its own. The second read request path issues the read requests with a lower latency than the first read request path, because the second read request path does not wait for the result of the security checking before issuing the security requests. In the second read request path, the security checking is removed from the critical path and so issuing is not delayed by security checking. On the other hand, the first read request path, although slower than the second read request, can handle more outstanding read requests at once, because the security check result is available before controlling issuing, and so there is no need to maintain a tracking data store for tracking the result of the security checking for the read requests issued using the first read request path.

Therefore, the security controller according to the present technique is able to provide a low latency response and handle a large number of outstanding access requests. By using the first read request path when the lower latency option of the second read request path is not needed, bandwidth in the second read request path can be saved for the transactions for which low latency is important. Nevertheless, when low latency is desired then this can be achieved using the second read request path.

It is not essential for the first and second read request paths to be physically distinct signal paths through the security controller. While in some embodiments the first and second read request paths may be provided separately, in other embodiments at least some circuitry may be shared by the second read request paths.

The selection of which path to use for handling an incoming read request may be made in dependence on an identifier associated with the read request. The identifier defines a property of the read request. The identifier may for example contain information indicative of how important, or latency-critical, a particular read request is. Hence, the identifier can be used to select whether to control issuing of the read request using the first read request path or the second read request path.

Similarly, the response received by the response path may also be associated with a corresponding identifier to enable the response path to determine whether a response corresponds to a read request issued using the first read request path or the second read request path.

In one example, the identifier may identify the source master device which initiated the read request. This can enable the security controller to implement a priority scheme where read requests from one master device are issued using the second read request path and so will be handled more quickly than read requests from another master device which are issued using the first read request path.

Also, the identifier may comprise a user-defined bit indicating whether issuing of an associated read request should be controlled using the first or second read request path. In this case, the user may explicitly indicate that a particular read request is latency-critical and should be processed using the second read request path, or is not latency-critical and should be processed using the first read request path.

The tracking data stored in the tracking data store may indicate for each outstanding read request issued by the second read request path:
(i) at least a portion of said identifier associated with said outstanding read request;
(ii) whether said security checking identified a security violation for said outstanding read request; and
(iii) a relative ordering of said outstanding read request with respect to other outstanding read requests having the same identifier.

Since multiple read requests may have the same identifier, the identifier alone may not be sufficient to distinguish multiple outstanding read requests from one another. To be able to uniquely identify the security checking result for each outstanding read request issued using the second read request path, the tracking data may store, together with the relevant portion of the identifier and security checking result for the outstanding read request, information indicating a relative ordering of the outstanding read request with respect to other outstanding read requests having the same identifier. This means that, when receiving responses to read requests issued using the second read request path, the response path can count through the received responses having a particular identifier, and for each response match the response to the security result for the read request having a corresponding position in the sequence of requests having the same identifier.

The tracking data store may comprise storage locations for storing tracking data for a predetermined number of outstanding read requests issued by the second read request path. Typically, maintenance of an entry in the tracking store requires a certain area and processing overhead, and so to conserve area and power consumption, the tracking data store would store entries for a limited number of outstanding read requests. The present technique recognises that it is likely that only a few read requests at a time would be latency-critical and so it will often be sufficient for the second read request path to handle only a predetermined number of outstanding read requests at a time. On the rare occasions when the tracking data store becomes fully occupied with tracking data for the predetermined number of outstanding read requests which have not yet completed, then the second read request path may prevent further read requests entering the second read request path until one of the predetermined number of outstanding read requests has completed. This maintains security of the read data because read requests are prevented from being issued using the second read request path if it would not be possible to store the tracking data indicating whether a security violation occurred for that request.

As well as masking the read data if the tracking data indicates that a security violation was identified for a read request issued using said second read request path, the response path may also modify the response to indicate that the security violation occurred. Hence, the master device which issued the read request can be informed that a security violation has arisen.

If a security violation is identified for a read request issued using the first read request path, then the violating read request can be handled in a number of ways.

In one example, the first read request path may respond to the violating read request by:
(i) preventing the violating read request from being issued until all preceding read requests issued using the first read request path have completed;
(ii) when the preceding read requests have completed, issuing the violating read request to the target slave device while preventing following read requests from being issued by the first read request path until the violating read request has completed; and
(iii) controlling the response path, when a response to the violating read request is received from said target slave device, to modify the response to mask read data read in response to the violating read request, and forward the modified response to said source master device.

Hence, in this approach the violating read request identified by the first read request path is isolated from other read requests by preventing it from being issued until all preceding read requests issued using the first read request path completed, and then issuing the violating read request whilst preventing following read requests from being issued until the violating read request has been completed. When a response to the violating read request is received, then the first read request path controls the response path to modify the response to mask the read data read in response to the violating read request. The modified response is then sent to the source master device with the read data masked out.

This approach has several advantages. Firstly, by issuing the violating read request even though the security violation has been identified, the total number of read requests issued by the security controller to the slave device is independent of whether the first read request path or the second read request path is selected for any given read request. Regardless of whether the read request is handled by the first or second read request path the read request will still be issued. This can be useful because, for example, downstream circuits such as a memory controller or the slave device itself may implement quality of service algorithms for monitoring the number of read requests being handled by the system. If a certain read request was blocked by the first read request path when a security violation is identified, then this could prevent the quality of service algorithms functioning correctly.

Another advantage of issuing a read request using the first read request path even if a security violation has occurred is efficiency of area implementation. Circuitry for modifying a response to a read request issued using the second read request path is already provided for masking read data if a security violation is identified for that read request. Hence, this circuitry can be reused so that it also masks the read data read in response to a security-violating read request identified by the first read request path. Hence this approach can be efficient in terms of circuit area.

Also, by blocking issuing of the violating read request until a preceding read request has completed and preventing following read requests being issued until the violated read request has completed, the violating read request can be isolated by the first read request path so that, at the point it is issued, that request is the only outstanding read request that has been issued using the first read request path. This is useful because this enables the first read request path to signal directly to the response path that the next response to a request issued using the first read request path will correspond to the violating read request and should have it read data masked by the response path. This means that there is no need for the first read request path to store tracking data indicating the results of security checking for requests issued using the first-read request path. Circuitry for storing tracking data and updating the tracking data based on the results of the security checking can require a significant amount of area and processing overhead and so typically would provide storage for only a limited number of outstanding read requests. By eliminating the need for such tracking data in the first read request path, the first read request path is able to handle a large number of outstanding transactions. Therefore, the first read request path provides a high bandwidth path for handling many outstanding transactions at once. This complements the lower latency approach of the second read request path so that the security controller as a whole is able to satisfy both the latency and high bandwidth requirements for handling read requests.

An alternative approach for handling read requests for which a security violation is identified by the first read request path is to prevent the violating read request from being issued and control the response path to generate a response indicating that the security violation occurred. The generated response may then be forwarded to the source master device which initiated the violating read request. Hence, in this example the read request which fails the security checking would not be issued to the slave device, and the security controller itself would return a message indicating that a security violation occurred to the source master device.

As mentioned above, the first and second read request path may share some circuitry in order to provide a more efficient area implementation of the security controller. For example, a security checking circuit for performing the security checking may be shared between the first and second read request paths.

It is possible that both the first and second read request paths may try to issue a read request to the target slave device at the same time. To ensure that the requests issued by the first read request path do not delay servicing of more latency-critical requests issued using the second read request path, an arbiter may be provided to arbitrate between the first and second read request paths so as to select read requests issued via the second read request path in preference to the read request issued by the first read request path.

In one embodiment, the slave device may comprise a memory system.

Various kinds of security checking may be performed using the security controller. In one example, the memory system may comprise at least one secure region of memory and at least one non-secure region of memory. The security checking may comprise checking, for a read request targeting the at least one secure region, whether the read request is authorised to access the at least one secure region.

For example, the security checking may be based on the TrustZone system provided by ARM Limited of Cambridge, UK. Each read request may be associated with an indication of whether it is a secure read request issued by a master device while operating in a secure mode or a non-secure read request issued by a master device while operating in a non-secure mode. Secure read requests can access both data in a secure region of memory and data in a non-secure region of memory, while non-secure read requests can only access data in a non-secure region of memory. Hence, if a non-secure read request attempts to access data in a secure region of memory, the security controller may indicate that a security violation has occurred.

As described above, the security controller has two read request paths for performing security checking for read requests. However, the security controller may also perform security checking for write requests. Hence the security control may comprise a write request path configured to perform the security checking for a write request and control issuing of the write request to a target slave device in dependence of the result of the security checking. The write request path is similar to the first read request path in that security checking is performed before controlling issuing of the write request in dependence on the result of the security checking. Write requests are not usually as latency-critical as read requests since, unlike read requests, the master device which issued a write request does not need to wait for data received from the slave device before carrying on with other processing. Hence, the delay caused by performing security checking is less significant for write requests than read requests.

As for a read request issued using the first read request path, if a write request causes a security violation, then there are different options for handling the security violation. While it would be possible to block issuing of write requests which cause a security violation, in a preferred embodiment, the write request path:

(i) prevents the violating write request from being issued until all preceding write requests have completed;

(ii) masks write data associated with the violating write request;

(iii) when the preceding write requests have completed, issues the violating write request, with the write data masked, to the target slave device while preventing following write requests from being issued by the write request path until the violating write request has completed; and (iv) controls a write response path, when a response to the violating write request is received from the target slave device, to modify the response to indicate that a security violation occurred and forward the modified response to the source master device that initiated the write request.

Hence, a write request which causes a security violation has its write data masked so that the write data cannot be written to the slave device. Nevertheless, the write request is issued and when a response is received from the slave device then the response is modified to indicate that a security violation occurred.

The security controller may be implemented in various parts of a data processing system. In some embodiments, the security controller may be a stand alone component of the system which can be connected to known master and slave devices, interconnects or buses in order to implement security checking.

Alternatively, the security controller may be implemented as part of the interconnect or bus which couples the master device to the slave device. In another example, the security controller may be part of a memory controller for controlling the memory system acting as a slave device.

Viewed from another aspect, the present invention provides a data processing apparatus comprising at least one master device, at least one slave device; and a security controller as described above.

Viewed from yet another aspect, the present invention provides a security controller comprising:

first and second read request path means for performing security checking of read requests received from at least one master device means for generating said read requests, and controlling issuing of said read requests to at least one slave device means for processing said read requests; and selecting means for selecting which of said first read request path means and said second read request path means to use for controlling issuing of an incoming read request; wherein if said first read request path means is selected for said incoming read request, then said first read request path means controls issuing of said read request to a target slave device means in dependence on a result of said security checking;

if said second read request path means is selected for said incoming read request, then said second read request path means issues said incoming read request to said target slave device means without waiting for a result of said security checking, and stores tracking data indicating said result of said security checking to a tracking data storage means for storing said tracking data;

said security controller comprises response path means for receiving a response to an issued read request from said target slave device means and forwarding said response to a source master device means which initiated said issued read request; and if said tracking data indicates that said security checking identified a security violation for an issued read request issued using said second read request path means, then said response path means modifies the response to said issued read request to mask read data read by said target slave device means in accordance with said issued read request, and forwards the modified response to said source master device means.

Viewed from another aspect the present invention provides a method of performing security checking for read requests received from at least one master device and controlling issuing of said read requests to at least one slave device, said method comprising the steps of:

selecting which of a first read request path and a second read request path to use for controlling issuing of an incoming read request;

if said first read request path is selected for said incoming read request, performing said security checking for said incoming read request and controlling issuing of said read request to a target slave device in dependence on a result of said security checking;

if said second read request path is selected for said incoming read request, performing said security checking for said incoming read request, issuing said incoming read request to said target slave device without waiting for a result of said security checking, and storing to a tracking data store tracking data indicating said result of said security checking;

receiving a response to the issued read request from said target slave device;

if said tracking data indicates that said security checking identified a security violation for an issued read request issued using said second read request path, modifying the response to said issued read request to mask read data read by said target slave device in accordance with said issued read request; and forwarding said response or said modified response to a source master device which initiated said issued read request.

Further embodiments, features and advantages of the present technique will be apparent from the following detailed description of embodiments, which is to be read in conjunction with the accompanying drawings.

DESCRIPTION OF THE EMBODIMENTS

Figure 1:
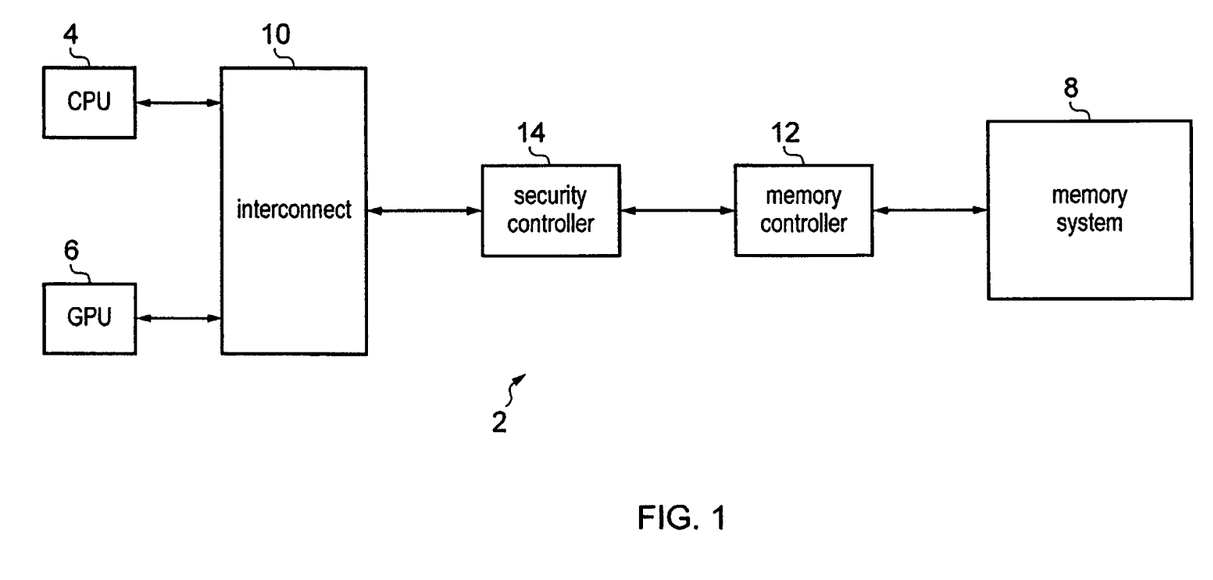
FIG. 1 schematically illustrates a data processing apparatus comprising a security controller for performing security checking of transaction requests received from a master device and for controlling issuing of the transaction requests to a slave device.

FIG. 1 schematically illustrates a data processing apparatus 2 comprising two master devices 4, 6 and a slave device 8. In this example, the master devices include a general purpose processing unit (CPU) 4 and a graphics processing unit (GPU) 6, and the slave device comprises a memory system 8. However, it will be appreciated that other types and/or different numbers of master and slave devices may be provided. An interconnect 10 couples the master devices 4, 6 to the slave device 8. In other embodiments the interconnect 10 may be replaced with a bus. A memory controller 12 is provided between the interconnect 10 and the memory system 8 to control access to the memory system 8. The master devices 4, 6 generate transaction requests, including read requests and write requests, and issue the transaction requests via the interconnect 10 to the memory controller 12. In response to the transaction requests, the memory controller 12 controls the memory system 8 to read or write data in response to the transaction request.

A security controller 14 is provided for performing security checking for the transaction requests issued by the master devices 4, 6 and controlling issuing of the transaction requests to the memory system 8. While FIG. 1 shows the security controller 14 being provided separately from the interconnect 10 and the memory controller 12, in other embodiments, the security controller 14 may be provided as part of the interconnect 10 (or bus) or within the memory controller 12.

Figure 2:
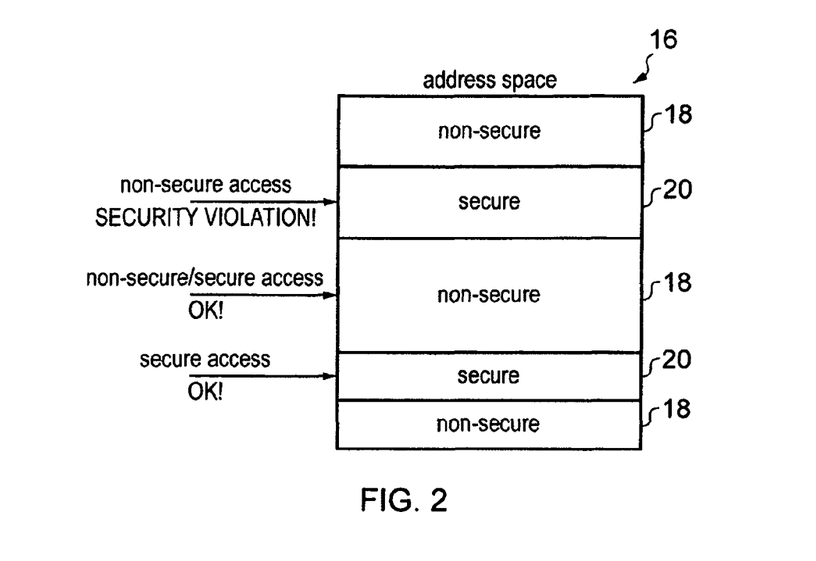
FIG. 2 schematically illustrates security checking of transaction requests.

FIG. 2 schematically illustrates an example of the security checking performed by the security controller 14. The memory system 8 has an address space 16 comprising at least one non-secure region 18 of memory and at least one secure region 20 of memory. Each read or write request to memory is designated as a non-secure request or a secure request. Data in non-secure regions 18 of memory can be read or written in response to both non-secure and secure access requests. In contrast, data in secure regions 20 of memory can only be read or written in response to a secure access request. As indicated in FIG. 2, if a non-secure access request seeks to read or write data in a secure memory region 20, then a security violation is identified. Hence, the secure regions 20 can be used to store sensitive data which can only be accessed by a secure transaction request, for example a request from a device operating in a secure mode of operation.

Figure 3:
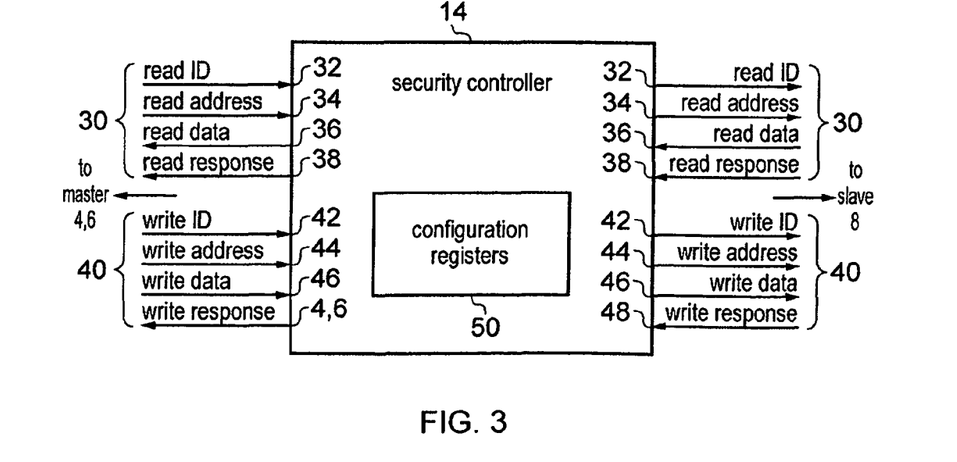
FIG. 3 illustrates an example of read and write transaction requests received by the security controller from a master device and read and write responses to the transaction requests received by the security controller from a slave device.

FIG. 3 illustrates the security controller 14 in more detail. The security controller 14 has a read path 30 and a write path 40. In the read path 30, the security controller 14 receives from the master device 4, 6 a read request comprising a read identifier 32 and a read address 34 indicating the target address of the read request. The read identifier 32 may comprise a number of fields identifying various properties of the read request. For example, the read identifier 32 may identify at least one of: the source master device which initiated the read request, burst transfer properties of the read requests; and whether the read request is a secure request or a non-secure request. The identifier 32 may also comprise a user-defined bit indicating whether the read request is considered latency-critical or not. Security controller 14 performs security checking on the read request. The read request including the identifier 32 and read address 34 are then forwarded to the slave device 8. In response to the read request, the slave device 8 reads data from the memory location indicated by the read address 34 and issues a response to the security controller 14. The response includes the read data 36 and a response message 38. The security controller forwards the response 36, 38 to the master device 4, 6 which initiated the read request.

Similarly, for a write request received on the write path 40, the security controller 14 receives a write identifier 42, a write address 44 indicating the target address of the write request and write data 46 representing the data to be written to the slave device 8. The security controller 14 performs security checking on the write request and controls issuing of the write request to the slave device 8. In response to the write request, the slave device 8 writes the write data to the storage location indicated by the write address 44 and returns a write response 48. The security controller 14 forwards the write response 48 to the master device 4, 6 which initiated the write request.

The security controller 14 comprises a set of configuration registers 50 which define properties of the security checking to be performed. For example, the configuration registers 50 may define which regions of the address space are non-secure regions 18 or secure regions 20.

Figure 4:
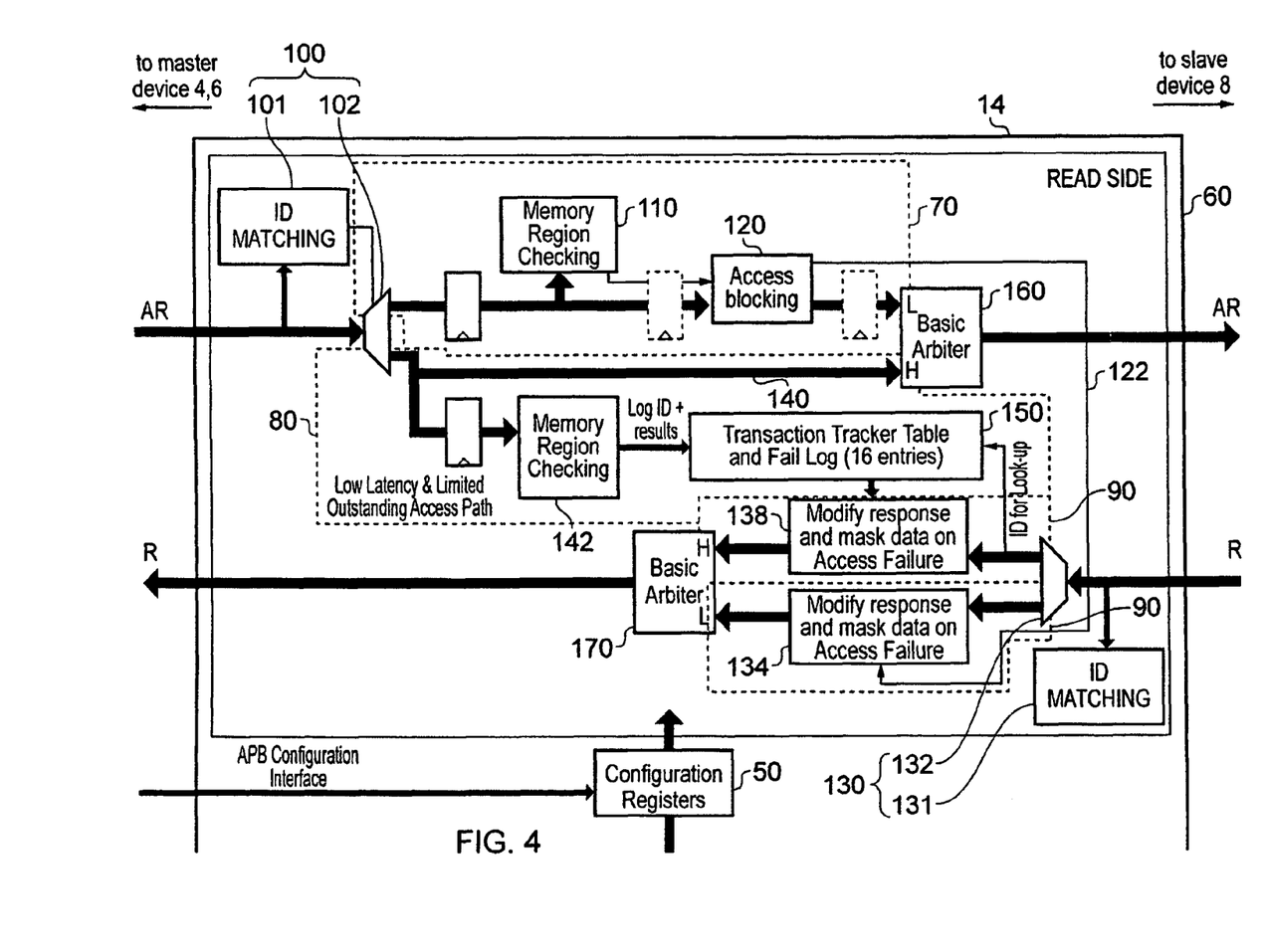
FIG. 4 schematically illustrates a security controller comprising first and second read request paths for performing security checking and controlling issuing of read requests.

FIG. 4 shows an example of the security controller 14 in more detail. The security controller 14 comprises a read portion 60 for handling read requests AR and responses R to the read requests, and a write portion 65 for handling write requests AW and responses B to the write requests.

The read portion 60 comprises a first read request path 70 and second read request path 80 for performing security checking for read requests received from the master device 4, 6 and controlling issuing of the read requests to the slave device 8. The read portion also comprises a response path 90 for handling responses to issued read requests.

The read portion 60 of the security controller 14 comprises path selecting circuitry 100 for selecting whether to issue an incoming read request using the first read request path 70 or the second read request path 80. The path selecting circuitry 100 comprises an identifier matching circuit 101 and a path selector 102. When an incoming read request is received from the master device 4, 6 by the security controller 14, then the identifier matching circuit 101 detects the read identifier 32 of the incoming read request and matches the identifier against read request routing data stored within the identifier matching circuit 101. The read request routing data indicates for each read identifier 32 which of the first read request path 70 and second read request path 80 should handle the read request associated with that identifier. The identifier matching circuit 101 then controls the path selector 102 to direct the transaction request to the appropriate one of the first and second read request paths 70, 80.

Different portions of the read identifier 32 may be used for the identifier matching. For example, the read identifier may include data indicating which of the master devices 4, 6 initiated the read request. The path selecting circuit 100 may select one of the read request paths 70, 80 based on which source device initiated the transaction. For example, one of the source master devices (for instance the GPU 6) may have its read transaction requests directed to the second path 80 while requests from another master device (for example the CPU 4) may be directed to the first path 70. Alternatively, the read identifier 32 may have a user-defined field which indicates explicitly which path should be used for a particular request. The user can use this field to indicated whether a transaction request is considered latency-critical or not and the selection of a processing path 70, 80 for handling the read request can be made accordingly so that the second path 80 processes the latency-critical read requests while the first path 70 processes the non-latency-critical read requests.

A path selecting circuit 130 in the response path 90 comprises an identifier matching circuit 131 and path selector 132 for performing a similar path selection to the path selecting circuit 100 of the read request paths 70, 80. When a response to an issued read request is received from the slave device 8, the identifier matching circuit 131 matches the identifier included with the response and controls the path selector 132 to direct the response to a first response modifying circuit 134 if the corresponding read request was issued using the first read request path 70 and to a second response modifying circuit 138 if the corresponding read request was issued using the second read request path.

The first read request path 70 provides a higher-latency, high bandwidth, path for performing security checking and controlling issuing of read requests to the slave device 8. In the first read request path 70, the steps of security checking and issue control are pipelined such that the security checking of the read request is performed first by a security checking circuit 110, and after the result of security checking is available, an access blocking circuit 120 controls issuing of the read request in dependence on the result of the security checking. Since the result of security checking must be known before issuing is controlled by the access blocking circuit 120, and security checking may take several processing cycles, the latency associated with the first read request path 70 issue controller is longer than for the second read request path 80. However, the first read request path 70 can handle a large number of outstanding read requests because little or no tracking information is required for the read requests.

If the security checking circuit 110 (which may also be referred to as a memory region checking circuit) identifies no security violation for a read request, then the access blocking circuit 120 issues the read request without waiting for preceding read requests to be completed. When the response path 90 receives a response to the issued read request, the first response modifying circuit 134 forwards the response to the master device 4, 6 without modifying the response.

On the other hand, if the security checking circuit 110 of the first read request path 70 identifies a security violation for a read request, then the access blocking circuit 120 stalls the pipeline so that the violating read request which causes the security violation is prevented from being issued until any preceding outstanding read request have completed (i.e. for each preceding read request, the read request has been serviced by the slave device 8, a response to the preceding read request has been received and the response has been forwarded to the master device 4, 6 by the response path 90). Once all preceding read requests have completed, the access blocking circuit 120 allows the read request which caused the security violation to be issued to the slave device 8, and signals to the response path 90 via signal path 122 that the currently issued read request has triggered a security violation. The access blocking circuit 120 then blocks issuing of any subsequent read requests using the first read request path 70 until the currently issued read request has completed.

When a response to the read request is received from the slave device 8, the path selecting circuit 130 directs the response to the first response modifying circuit 134. In response to the indication of a security violation received from access blocking circuit 120 via signal path 122, the first response modifying circuit 134 modifies the response to the issued read request to indicate that a security violation occurred and to mask the read data read from the slave device 8 in response to the read request. By masking the read data, the master device 4, 6 which issued the security violating read request cannot inappropriately gain access to secure data read from a secure region 20 of memory in the slave device 8. The response path 90 forwards the modified, masked, response to the source master device 4, 6 which issued the read request. Since the read request which caused the security violation has now completed, the access blocking circuit 120 in the first read request path 70 then resumes issuing of subsequent read requests.

The second read request path 80 provides a low latency access path which can handle a predetermined number of outstanding read requests at a time. The second read request path 80 comprises a bypass path 140 and a security checking circuit 142. The bypass path 140 bypasses security checking such that when a read request is directed to a second read request path 80 by the path selecting circuit 100, the read request is issued along the bypass path 140 without waiting for the result of security checking. Meanwhile, the security checking circuit 142 performs security checking for the issued request. When the result of security checking becomes available then the security checking circuit 142 stores tracking data indicating the security checking result to a tracking data store 150. The tracking data indicates, for each outstanding read request which has been issued using the second read request path 80, whether or not a security violation occurred.

When a response to a read request issued using the second read request path 80 is received from the slave device 8, then the path selecting circuit 130 directs the response to the second response modifying circuit 138. The second response modifying circuit 138 looks up the corresponding entry in the tracking data store 150 and determines whether or not a security violation was identified for the read request corresponding to the currently received response. If no security violation was identified, then the response modifying circuit 138 forwards the received response to the source master device 4, 6 which initiated the read request without masking the read data or modifying the response. On the other hand, if a security violation was identified then the response is modified to mask the read data and indicate that a security violation occurred, and the modified response is forwarded to the source master device 4, 6.

Hence, the second read response path provides a low latency path which can issue read requests quickly without waiting for the result of the security checking. On the other hand, the first read request path 70 has a higher latency, especially if a security violation is identified, but is able to handle a larger number of outstanding requests than the second read request path 80 because no tracking data is stored by the first read request path 70. Hence, the combination of the first and second read request paths 70, 80 achieve a better balance between achieving a low latency and handling a large number of outstanding read requests than could be achieved by either the first read request path 70 or the second read request path 80 alone.

On some occasions, the first and second read request paths 70, 80 may attempt to issue read requests to the slave device 8 simultaneously. To prevent read requests from the first read request path 70 delaying more latency-critical read requests from the second read request path 80, an arbiter 160 is provided to arbitrate between the different read request paths 70, 80. The arbiter 160 selects the read requests issued by the second read request path 80 in preference to the read requests issued by the first read request path 70, so that the latency in handling read requests issued using the second read request path 80 is reduced.

Similarly, an arbiter 170 provided in the response path 90 prioritizes responses forwarded from the second response multiplying circuit 138 over responses forwarded from the first response modifying circuit 134. The response to a latency-critical read request issued using the second read request path 80 will therefore be forwarded to the master device 4, 6 by the arbiter 160 without being delayed by a response to a less latency-critical read request issued using the first read request path 70.

As in FIG. 3, the security controller 14 comprises configuration registers 50 for defining properties of the security checking. For example, the registers 50 may define the address ranges of the non-secure regions 18 and secure regions 20 of memory. By comparing the read address associated with an incoming read request with the address ranges of the regions 18, 20, the security checking circuits 110, 142 can determine whether there is a security violation. The configuration registers 50 may also define whether, for each read identifier 32, a read request having that identifier should be handled using the first read request path 70 or the second read request path 80.

The write portion 65 of the security controller 14 is similar to the first read request path 70 in that the security checking result is determined by a security (memory region) checking circuit 200 before issuing of a write request is controlled by access blocking/modifying circuit 210 in dependence on the security checking result. If no security violation is identified, then the write request is issued unmodified to the slave device 8. On the other hand, if a security violation is identified, then the access blocking/modifying circuit 210 modifies the write request to mask the write data W associated with the request, and blocks issuing of the write request until any preceding outstanding write requests have completed. Once the preceding write requests have completed, the access blocking/modifying circuit 210 issues the modified write request to the slave device 8, and signals via path 215 that a security violation has been identified for the currently issued write request. When a response to the issued write request is received then the write response path 220 of the write portion 65 modifies the response to indicate that a security violation occurred, and forwards the modified response to the master device 4, 6 which initiated the write request. Hence, the write portion 65 operates in a similar way to the first read request path 70 of the read portion 60.

Figure 5:
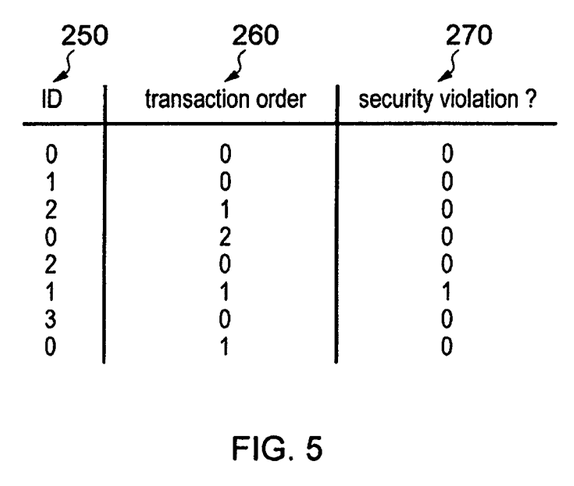
FIG. 5 illustrates an example of tracking data for indicating the results of security checking for outstanding read requests issued using the second read request path.

FIG. 5 shows an example of tracking data stored in the tracking data store 150 for outstanding read requests issued using the second read request path 80. For each outstanding read request, the corresponding entry in the tracking table contains an identifier field 250 indicating the read identifier 32 associated with the read request, a transaction ordering field 260 indicating the relative ordering between read requests having the same identifier 32, and a security violation field 270 indicating whether or not a security violation occurred for the read request. The identifier field 250 stores at least the relevant portion of the read identifier 32 required to identify the ordering requirements of the accesses (e.g. the portion used to identify which path 70, 80 to use). In the example of FIG. 5, the transaction ordering field 260 comprises a numeric value which distinguishes between multiple outstanding requests having the same identifier. In this example, a request having a lower value of the transaction ordering field 260 is assumed to have been issued before a read request having a higher value of the transaction ordering field 260. Alternatively, a higher value may indicate an earlier request and a lower value may indicate a later request. It will be appreciated that other numeric representations of the transaction ordering may also be used.

When a response to a read request issued by the second read request path 80 is received by the response path 90, then the second response modifying circuit 138 checks the transaction tracking table 150. By counting the number of responses having a particular identifier 32 and matching these responses against the corresponding sequence of entries as indicated by the identifier field 250 and transaction ordering field 260, the response modifying circuit 138 can determine which entry corresponds to the currently received response and can read from the transaction tracking data store 150 whether a security violation occurred for that request. If a security violation occurred then the read data is masked and the response modified to indicate the security violation so that the master device 4, 6 cannot gain access to the secure data.

It will be appreciated that other types of data may be stored in the transaction data store 150 in addition to the fields indicated in FIG. 5. In FIG. 5 an example is given where the tracking data store 150 comprises 8 entries, but a larger tracking table may be used, for example 16 entries as indicated in FIG. 4. When an outstanding transaction request is complete and the response to the request has been forwarded to the corresponding master device 4, 6, then the entry associated with that request can be overwritten with an entry for a newly issued read request. If all of the entries of the tracking data store 150 are full and are storing data for an outstanding read request which has not yet completed, then no further read requests can be issued using the second read request path 80 because it would not be possible to store tracking data for that request. Hence, if the predetermined number of entries of the tracking table 150 are fully occupied then the second read request path 80 stalls issuing of read requests until one of the outstanding read requests has completed.

In the example shown in FIG. 4, the first and second read request paths 70, 80 and the corresponding portions of the response path 90 are provided with separate circuits. However, since much of the functionality of the read request paths 70, 80 and response path 90 is duplicated, circuitry can be shared between the respective paths.

Figure 6:
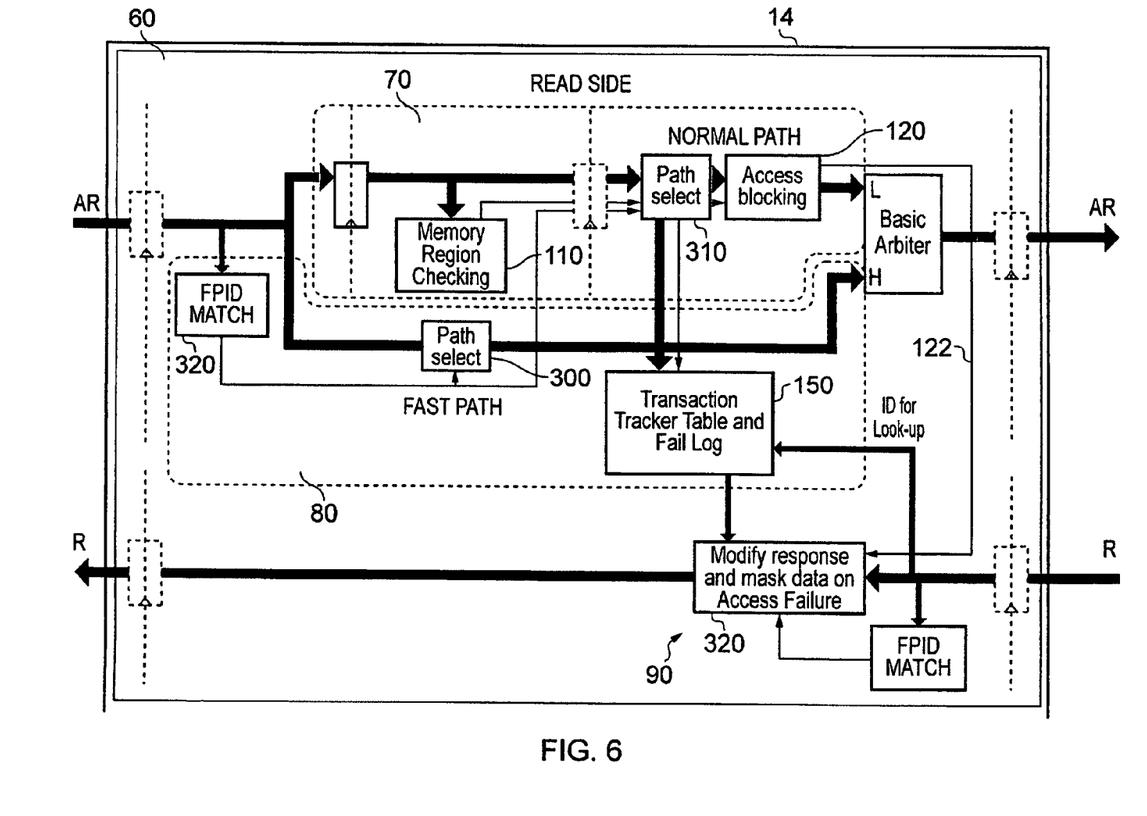
FIG. 6 illustrates a security controller in which some circuitry is shared between the first and second read request paths.

FIG. 6 shows an example of an implementation in which a security checking circuit 110 and response modifying circuit 320 are shared between the respective paths. The security controller 14 again comprises a read portion 60 and a write portion 65. As in FIG. 4, the read portion comprises a first read request path 70, a second read request path 80 and a response path 90. However, in the example of FIG. 6 the security checking circuit 110 of the first read request path 70 is reused for performing security checking of read requests handled using the second read request path 80. Hence, in this example read requests are directed down both paths 70, 80, but path selection circuitry 300, 310 is provided within the first and second read requests paths 70, 80 to select the functionality appropriate to each request.

An identifier matching circuit 320 is similar to the matching circuit 101 of FIG. 4. If the identifier matching circuit 320 identifies that a read request should be handled using the first read request path 70, then the path selection circuit 300 blocks the read request from being issued using the second read request path 80. Security checking circuit 110 performs security checking for the request. Path selection circuitry 310 controls issuing of the request based on the security checking result in the same way as discussed above with respect to FIG. 4.

If the identifier matching circuit 320 identifies that a read request should be handled by the second read request path 80, then the path selection circuitry 300 allows the read request path to proceed and be issued by the second read request path 80 without waiting for a result of security checking. Meanwhile, the read request is also directed to the first read request path 70, in which the security checking circuit 110 performs the security check for the read request. Path selection circuitry 310 prevents the read request being issued using the first read request path (since the request has already been issued using the second read request path), and stores the result of the security checking to the transaction tracking data store 150.

When a response to a request is received, then the response is directed to a shared response modifying circuit 320 which combines the functionality of the response modifying circuits 134, 138 shown in FIG. 4. For read requests issued using the first read request path 70, the response modifying circuit 320 identifies whether there was a security violation based on the signal provided from the first read request path 70 via the security violation indicating path 122 (in the same way as in FIG. 4). For requests issued using the second read request path 80, the response modifying circuitry 320 determines whether a security violation occurred using the corresponding tracking data entry in the transaction tracking table 150. If a security violation was identified, then the response modifying circuitry 320 modifies the response to indicate the security violation and masks the read data before forwarding the modified response to the corresponding masking device 4, 6. On the other hand, if there was no security violation, then the response received from the slave device 8 is forwarded unmodified to the master device 4, 6.

Hence, in the example of FIG. 6, the circuit area of the system can be reduced by sharing circuitry between the respective paths. In the example of FIG. 6, the write portion 65 operates in the same way as in FIG. 4.

While the preceding examples show the read portion 60 of the security controller 14 comprising two read request paths, it will be appreciated that further read request paths may be provided if desired to implement other kinds of security checking functionality. For example, one may wish to provide a third read request path which is similar to the first read request path 70 in that security checking is performed before issuing the read requests. However, when a security violation is identified, the third read request path continues to issue read requests, without waiting for the preceding read requests to complete as in the previous embodiment. This can reduce the latency which arises when a security violation is identified. However, this is at the expense of requiring additional tracking data to track whether a security violation occurred for the issued requests since the request which caused a security violation would no longer isolated from other requests, and so the tracking data would be required to identify which response corresponds to the security violating read request. Hence, the provision of first and second read request paths as described above does not exclude the possibility of providing further read request paths.

In the embodiment described above, read requests which fail the security checking in the first read request path 70 are still issued to the slave device. Alternatively, the first read response path 70 may block issuing of read requests which are identified to cause security violation. Hence, rather than forwarding a read request to the slave device, the read request which failed the security check can be prevented from being issued. In this case, the response modifying circuit 134, 320 corresponding to the first read request path 70 would generate a response indicating that the security violation occurred, rather than modifying a response from the slave device (since the security violating read request is not issued, there would be no response from the slave device).

Figure 7A:
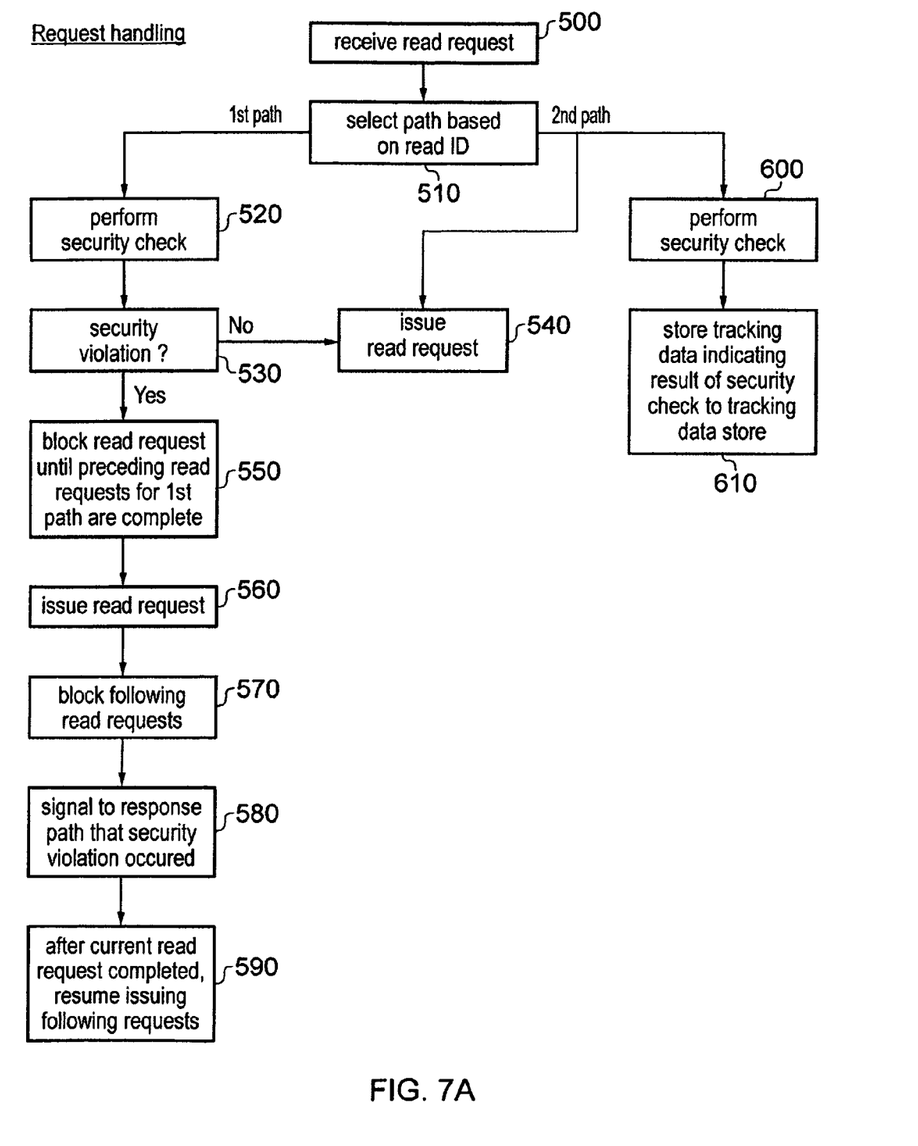
FIGS. 7A and 7B illustrate a method of performing security checking of a read request and controlling issuing of the read request to a slave device, with FIG. 7A showing handling of the read request and FIG. 7B showing handling of the response to the read request.
Figure 7B:
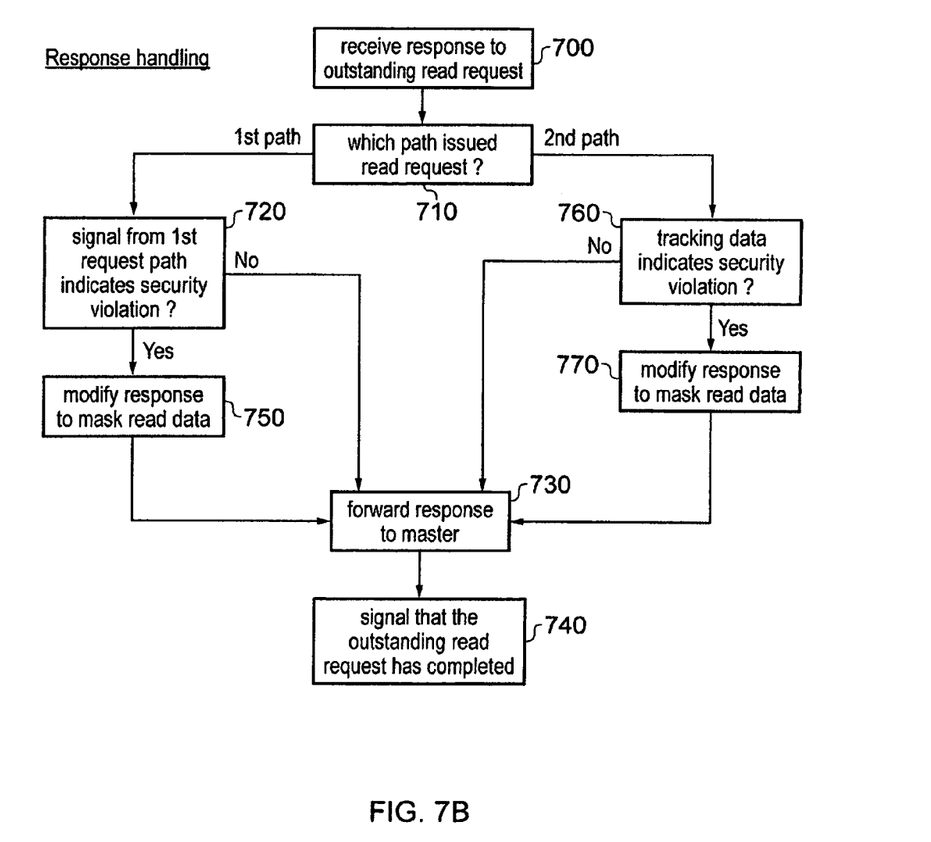

FIGS. 7A and 7B illustrate a method of performing security checking for read requests received from a master device 4, 6 and controlling issuing of the read requests to at least one slave device 8. FIG. 7A shows the handling of the read request by the first and second read request paths 70, 80 of the security controller 14, while FIG. 7B illustrates the handling of the response to these requests by the response path 90.

At step 500 of FIG. 7A, an incoming read request is received by the security controller 14. At step 510, the path selecting circuit 100 checks the read identifier 32 and determines whether the read request is of a type that should be handled using the first read request path 70 or the second read request path 80.

If the read request is handled using the first read request path 70, then at step 520, a security check is performed for the read request. For example, it is determined whether the read request is a secure or non-secure read request, and if the read request is a non-secure read request targeting a secure region of memory then a security violation is identified. At step 530 it is determined whether a security violation has been identified. If no security violation is identified, then at step 540 the read request is issued to the slave device 8.

On the other hand, if a security violation is identified at 530, then at step 550 the read request which triggered the security violation is blocked until the preceding read requests issued using the first read request path 70 have completed. After the preceding read requests have completed, the read request is issued at step 560. Following read requests are blocked at step 570 so that they cannot be issued. The first read request path 70 then issues a signal via signal path 122 to the response path 90 to indicate that the security violation occurred (step 580). At step 590, after the current read request which caused the security violation has completed, the first read request path 70 resumes issuing the following read requests.

If at step 510 the second read request path is selected, then the read request is issued at step 540. Meanwhile, a security check is performed for the issued read request at step 600. The second read request path 80 stores tracking data indicating a result of the security check to the tracking data store 150 at step 610 of FIG. 7A.

When a response to a read request is received at step 700 of FIG. 7B, the path selecting circuit 130 determines at step 710 which of the first and second read request path 70, 80 issued the read request corresponding to the received response, based on an identifier contained within the response which corresponds to the read identifier 32 associated with the issued request.

If the read request was issued using the first read request path 70, then at step 720 the first response modifying circuit 134 determines whether the signal on path 122 indicates that a security violation occurred for the request corresponding to the current received response. If no security violation is indicated, then at step 730, the response is forwarded to the source master device 4, 6 without being modified. The response path then signals at step 740 that the outstanding read request is complete. On the other hand if a security violation was indicated by the first read request path 70 along path 122, then at step 750 the response is modified to mask the read data read by the slave device 8 in response to the issued read request. The response modifying circuit 134 may also modify the response to indicate that the security violation occurred. Then, the method proceeds to step 730 where the modified response is forwarded to the master device. Again, at step 740 the response path 90 signals that the outstanding read request has completed, so that the first read request path 70 can resume issuing read requests (see step 590 of FIG. 7A).

For a response issued using the second read request path 80, the second response modifying circuit 138 determines at step 760 whether a security violation is indicated in the tracking data stored in the tracking data store 150 for the request corresponding to the current response. If no security violation is indicated, then steps 730 and 740 are again performed to forward the received response to the master device 4, 6 and signal that the read request has completed. On the other hand, if a security violation is indicated then at step 770 the response is modified to mask the read data and indicate a security violation, and the modified response is forwarded to the master at step 730 before proceeding once more to step 740. By signaling that the response issued using the second read request path has completed at step 740, the second read request path 80 can be informed that the corresponding entry in the tracking table 150 can be overwritten with tracking data for a new request.

In summary, by providing two read request paths, a first read request path 70 for handling a large number of read requests with regular latency, and a second read request path 80 for handling a smaller number of read requests with low latency, the security controller 14 according to the present technique is able to meet both the latency and bandwidth requirements.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A security controller comprising:
   first and second read request paths configured to perform security checking of read requests received from at least one master device and to control issuing of said read requests to at least one slave device; and a selector configured to select which of said first read request path and said second read request path to use for controlling issuing of an incoming read request; wherein:

if said first read request path is selected for said incoming read request, then said first read request path controls issuing of said read request to a target slave device in dependence on a result of said security checking;

if said second read request path is selected for said incoming read request, then said second read request path issues said incoming read request to said target slave device without waiting for a result of said security checking, and stores to a tracking data store tracking data indicating said result of said security checking;

said security controller comprises a response path configured to receive a response to an issued read request from said target slave device and to forward said response to a source master device which initiated said issued read request; and if said tracking data indicates that said security checking identified a security violation for an issued read request issued using said second read request path, then said response path modifies the response to said issued read request to mask read data read by said target slave device in accordance with said issued read request, and forwards the modified response to said source master device.

2. The security controller according to claim 1, wherein each read request is associated with an identifier identifying a property of the read request; and said selector is configured to select, in dependence on said identifier associated with said incoming read request, which of said first read request path and said second read request path to use for controlling issuing of an incoming read request.

3. The security controller according to claim 2, wherein said identifier identifies the source master device which initiated the read request.

4. The security controller according to claim 2, wherein said identifier comprises a user-defined bit indicating whether issuing of an associated read request should be controlled using said first read request path or said second read request path.

5. The security controller according to claim 2, wherein said tracking data indicates for each outstanding read request issued by said second read request path:

(i) at least a portion of said identifier associated with said outstanding read request;

(ii) whether said security checking identified a security violation for said outstanding read request; and (iii) a relative ordering of said outstanding read request with respect to other outstanding read requests having the same identifier.

6. The security controller according to claim 1, wherein said tracking data store comprises storage locations for storing tracking data for a predetermined number of outstanding read requests issued by said second read request path; and if said tracking data store is fully occupied with tracking data for said predetermined number of outstanding read requests which have not yet completed, then said second read request path prevents further read requests being issued by said second read request path until one of said predetermined number of outstanding read requests has completed.

7. The security controller according to claim 1, wherein if said tracking data indicates that said security checking identified a security violation for a read request issued using said second read request path, then said response path further modifies said response to indicate that said security violation occurred.

8. The security controller according to claim 1, wherein if said security checking for said first read request path identifies a violating read request which causes a security violation, then said first read request path:

(i) prevents said violating read request from being issued until all preceding read requests issued using said first read request path have completed;

(ii) when said preceding read requests have completed, issues said violating read request to said target slave device while preventing following read requests from being issued by said first read request path until said violating read request has completed; and (iii) controls said response path, when a response to said violating read request is received from said target slave device, to modify said response to mask data read in response to said violating read request, and forward said modified response to said source master device.

9. The security controller according to claim 1, wherein if said security checking for said first read request path identifies a violating read request which causes a security violation, then said first read request path prevents said violating read request from being issued and controls said response path to generate a response indicating that a security violation occurred and to forward said response to said source master device.

10. The security controller according to claim 1, wherein said first and second read request paths share a security checking circuit for performing said security checking.

11. The security controller according to claim 1, wherein said first read request path and said second read request path issue said read requests to said target slave device via an arbiter; and said arbiter is configured such that, if both said first read request path and said second read request path issue a read request, then said arbiter issues to said target slave device said read request issued by said second read request path in preference to said read request issued by said first read request path.

12. The security controller according to claim 1, wherein said at least one slave device comprises a memory system.

13. The security controller according to claim 12, wherein said memory system comprises at least one secure region of memory and at least one non-secure region of memory, and said security checking comprises checking, for a read request targeting said at least one secure region, whether said read request is authorised to access said at least one secure region.

14. The security controller according to claim 1, comprising a write request path configured to perform said security checking for write requests and to control issuing of said write requests to a target slave device in dependence on a result of said security checking.

15. The security controller according to claim 14, wherein if said security checking identifies a violating write request which causes a security violation, then said write request path:

(i) prevents said violating write request from being issued until all preceding write requests have completed;

(ii) masks write data associated with said violating write request;

(iii) when said preceding write requests have completed, issues said violating write request to said target slave device while preventing following write requests from being issued by said write request path until said violating write request has completed; and (iv) controls a write response path, when a response to said violating write request is received from said target slave device, to modify said response to indicate that a security violation occurred and forward said modified response to the source master device that initiated the write request.

16. The security controller according to claim 1, wherein said security controller is part of an interconnect or bus coupling said at least one master device to said at least one slave device.

17. The security controller according to claim 12, wherein said security controller is part of a memory controller for controlling said memory system.

18. A data processing apparatus comprising
the security controller according to claim 1 wherein said at least one master device and said at least one slave device are in said data processing apparatus.

19. A security controller comprising:
first and second read request path means for performing security checking of read requests received from at least one master device means for generating said read requests, and controlling issuing of said read requests to at least one slave device means for processing said read requests; and
selecting means for selecting which of said first read request path means and said second read request path means to use for controlling issuing of an incoming read request; wherein
if said first read request path means is selected for said incoming read request, then said first read request path means controls issuing of said read request to a target slave device means in dependence on a result of said security checking;
if said second read request path means is selected for said incoming read request, then said second read request path means issues said incoming read request to said target slave device means without waiting for a result of said security checking, and stores tracking data indicating said result of said security checking to a tracking data storage means for storing said tracking data;

said security controller comprises response path means for receiving a response to an issued read request from said target slave device means and forwarding said response to a source master device means which initiated said issued read request; and
if said tracking data indicates that said security checking identified a security violation for an issued read request issued using said second read request path means, then said response path means modifies the response to said issued read request to mask read data read by said target slave device means in accordance with said issued read request, and forwards the modified response to said source master device means.

20. A method of performing security checking for read requests received from at least one master device and controlling issuing of said read requests to at least one slave device, said method comprising the steps of:
selecting which of a first read request path and a second read request path to use for controlling issuing of an incoming read request;
if said first read request path is selected for said incoming read request, performing said security checking for said incoming read request and controlling issuing of said read request to a target slave device in dependence on a result of said security checking;
if said second read request path is selected for said incoming read request, performing said security checking for said incoming read request, issuing said incoming read request to said target slave device without waiting for a result of said security checking, and storing to a tracking data store tracking data indicating said result of said security checking;
receiving a response to the issued read request from said target slave device;
if said tracking data indicates that said security checking identified a security violation for an issued read request issued using said second read request path, modifying the response to said issued read request to mask read data read by said target slave device in accordance with said issued read request; and
forwarding said response or said modified response to a source master device which initiated said issued read request.

* * * * *